United States Patent
Zhang et al.

(10) Patent No.: US 11,860,966 B2
(45) Date of Patent: Jan. 2, 2024

(54) SYSTEMS AND METHODS FOR AUTOMATICALLY CREATING CONTENT MODIFICATION SCHEME

(71) Applicant: Google LLC, Mountain View, CA (US)

(72) Inventors: Guannan Zhang, Shanghai (CN); Yiling Zhang, Shanghai (CN)

(73) Assignee: GOOGLE LLC, Mountain View, CA (US)

( * ) Notice: Subject to any disclaimer, the term of this patent is extended or adjusted under 35 U.S.C. 154(b) by 480 days.

(21) Appl. No.: 16/694,460

(22) Filed: Nov. 25, 2019

(65) Prior Publication Data
US 2020/0089726 A1    Mar. 19, 2020

Related U.S. Application Data

(63) Continuation of application No. 15/220,088, filed on Jul. 26, 2016, now Pat. No. 10,503,802, which is a continuation of application No. PCT/CN2014/071878, filed on Feb. 7, 2014.

(51) Int. Cl.
*G06F 16/955* (2019.01)
*G06F 16/23* (2019.01)

(52) U.S. Cl.
CPC .......... *G06F 16/9566* (2019.01); *G06F 16/23* (2019.01)

(58) Field of Classification Search
CPC .............................. G06F 16/9566; G06F 16/23
See application file for complete search history.

(56) References Cited

U.S. PATENT DOCUMENTS

| | | | | |
|---|---|---|---|---|
| 6,144,962 | A * | 11/2000 | Weinberg | ................ G06F 11/32 |
| 8,196,162 | B2 | 6/2012 | Van De Klashorst | |
| 8,983,980 | B2 | 3/2015 | Song et al. | |
| 2002/0147805 | A1* | 10/2002 | Leshem | ................. H04L 29/06 709/223 |
| 2009/0292984 | A1 | 11/2009 | Bauchot et al. | |
| 2009/0328113 | A1 | 12/2009 | Van De Klashorst | |
| 2010/0036784 | A1* | 2/2010 | Mishne | ................. G06F 16/353 706/45 |

(Continued)

FOREIGN PATENT DOCUMENTS

| | | |
|---|---|---|
| CN | 101027626 | 8/2007 |
| CN | 101685447 | 3/2010 |
| CN | 102650999 | 8/2012 |

OTHER PUBLICATIONS

Final Office Action for U.S. Appl. No. 15/220,088 dated Apr. 23, 2019 (14 pages).

(Continued)

*Primary Examiner* — Huawen A Peng
(74) *Attorney, Agent, or Firm* — Dority & Manning, P.A.

(57) ABSTRACT

Systems and methods for automatically associating content characteristics to a third-party content are provided. A uniform resource locator identifying a resource is received from a content provider. The content is rendered to produce an object tree. A first node of the object tree is determined, where the first node represents a content slot. A second node of the object tree proximate to the first node is identified. The second node has a content characteristic, which is extracted. The extracted content characteristic is associated with the first node and stored.

20 Claims, 5 Drawing Sheets

(56) References Cited

U.S. PATENT DOCUMENTS

| | | | | |
|---|---|---|---|---|
| 2010/0185507 A1* | 7/2010 | Tokuda | ................. | G06Q 50/01 |
| | | | | 705/14.66 |
| 2011/0066957 A1 | 3/2011 | Prats et al. | | |
| 2011/0239163 A1 | 9/2011 | Mochizuki et al. | | |
| 2011/0314028 A1 | 12/2011 | Radomski et al. | | |
| 2013/0097011 A1* | 4/2013 | Wang | .................... | G06Q 30/02 |
| | | | | 705/14.45 |
| 2014/0129351 A1* | 5/2014 | Ringdahl | ........... | G06Q 30/0275 |
| | | | | 705/14.71 |
| 2014/0164447 A1* | 6/2014 | Tarafdar | ................ | G06F 16/182 |
| | | | | 707/827 |

OTHER PUBLICATIONS

International Preliminary Report on Patentability and Written Opinion of the International Searching Authority for PCT/CN2014/071878 dated Aug. 18, 2016 (8 pages).

International Search Report and Written Opinion of the International Searching Authority for PCT/CN2014/071878 dated Nov. 15, 2014 (15 pages).

Non-Final Office Action on U.S. Appl. No. 15/220,088 dated Nov. 16, 2018 (16 pages).

Notice of Allowance on U.S. Appl. No. 15/220,088 dated Aug. 5, 2019 (9 pages).

* cited by examiner

SYSTEMS AND METHODS FOR AUTOMATICALLY CREATING CONTENT MODIFICATION SCHEME

RELATED APPLICATIONS

This application claims the benefit of priority under 35 U.S.C. § 120 as a continuation of U.S. patent application Ser. No. 15/220,088, titled "SYSTEMS AND METHODS FOR AUTOMATICALLY CREATING CONTENT MODIFICATION SCHEME", and filed Jul. 26, 2016, which is a continuation of, and claims priority to and the benefit of International Patent Application No. PCT/CN2014/071878, filed Feb. 4, 2014, titled "SYSTEMS AND METHODS FOR AUTOMATICALLY CREATING CONTENT MODIFICATION SCHEME", each of which is hereby incorporated by reference herein in its entirety for all purposes.

BACKGROUND

In a computerized content delivery network, first-party content providers can provide information for public presentation of resources, such as web pages, documents, applications, and/or other resources. Additional third-party content can also be provided by third-party content providers for presentation on the client device together with the first-party content provided by the first-party content providers. Thus, a user viewing a resource can access the first-party content that is the subject of the resource as well as the third-party content that may or may not be related to the subject matter of the resource.

User experience in viewing the resource is very important for both for first-party content providers and third-party content providers. In order to improve the user experience, many first-party content providers control the look-and-feel of the third-party content by using closed ad servers that provide only advertisements that are specifically designed for each resource.

SUMMARY

One implementation of the present disclosure is a computerized method for automatically creating a content modification scheme for content. The method is performed by a processing circuit. The method includes receiving a uniform resource locator (URL) from a content provider, the URL identifying a resource. The method further includes rendering the resource to produce an object tree, determining a first node of the object tree representing a content slot, and identifying a second node of the object tree proximate to the first node, the second node having a content characteristic. The method further includes extracting the content characteristic from the second node, associating the content characteristic with the first node of the object tree and storing, in a data structure maintained in a memory element, the association of the determined first node and the associated content characteristic.

In some implementations, determining a first node of the object tree includes traversing the object tree until a first node representing a content slot is encountered.

In some implementations, determining a first node of the object tree comprises traversing the entire object tree to identify a plurality of nodes representing a content slot and selecting one of the plurality of nodes.

In some implementations, identifying a second node comprises identifying a second node immediately adjacent in the object tree to the first node.

In some implementations, identifying a second node comprises identifying a plurality of nodes within a predetermined distance from the first node.

In some implementations, the method further comprises identifying a content characteristic associated with at least some of the plurality of second nodes.

In some implementations, identifying a content characteristic comprises identifying a content characteristic associated with a majority of the plurality of second nodes.

In some implementations, identifying a content characteristic comprises averaging the value of a content characteristic associated with at least some of the plurality of second nodes.

In some implementations, identifying a content characteristic comprises identifying a font associated with at least one of the plurality of second nodes.

In some implementations, identifying a content characteristic comprises assigning a weight to each of the plurality of second nodes and identifying a content characteristic comprising a weighted average of the value of a content characteristic associated with at least some of the plurality of second nodes.

Another implementation of the present disclosure is a system for automatically creating a content modification scheme for content. The system includes a receiver accepting a URL from a content provider, the URL identifying a resource, and a renderer in communication with the receiver, the renderer producing an object tree associated with the resource. The system further includes a first node identifier accessing the object tree produced by the renderer, the first node identifier determining a first node of the object tree representing a content slot, and a second node identifier in communication with the first node identifier, the second node identifier determining a second node of the object tree proximate to the first node, the second node having a content characteristic. The system further includes an extractor engine in communication with the second node identifier, the extractor engine extracting content characteristics of the second node, and a linker in communication with the extractor engine and the first node identifier, the linker associating the content characteristic with the first node of the object tree. The system further includes a data manager in communication with the linker and a memory element, the data manager storing the association of the determined first node and the associated content characteristic in a data structure maintained in the memory element.

In some implementations, the first node identifier comprises a tree traversal module accessing the object tree produced by the renderer, the tree traversal module traversing the object tree until a first node representing a content slot is encountered.

In some implementations, the first node identifier comprises a tree traversal module accessing the object tree produced by the renderer, the tree traversal module traversing the entire object tree to identify a plurality of nodes representing a content slot, and a node selector in communication with the tree traversal module, the node selector selecting one of the plurality of nodes to determine a first node.

In some implementations, the second node identifier comprises a closest node selector in communication with the first node identifier, the closest node selector identifying the second node immediately adjacent in the object tree to the first node.

In some implementations, the second node identifier comprises a node distance calculator in communication with the first node identifier, the node distance calculator calculating a distance between the first node and each of a plurality of second nodes in the object tree, and a multi-node identifier in communication with the renderer, the multi-node identifier identifying the plurality of second nodes within a predetermined distance from the first node.

In some implementations, the multi-node identifier further comprises a content characteristic analyzer in communication with the node distance calculator, the content characteristic analyzer identifying a content characteristic associated with at least some of the plurality of second nodes.

In some implementations, the content characteristic analyzer further comprises a node counter accessing the object tree produced by the renderer, the node counter calculating a first number equal to the number of nodes in the object tree, and determining a second number equal to a minimum number of nodes required to be a majority of the plurality of second nodes. The implementation further comprises a content characteristic analyzer, in communication with the node counter, identifies a content characteristic associated with at least the second number of nodes.

In some implementations, the multi-node identifier further comprises content characteristic smoother in communication with the content characteristic analyzer, the content characteristic smoother averaging the value of a content characteristic associated with at least some of the plurality of second nodes.

In some implementations, the multi-node identifier further comprises a font identifier in communication with the content characteristic analyzer, the font identifier identifying a font associated with at least one of the plurality of second nodes.

In some implementations, the multi-node identifier further comprises content characteristic compounder in communication with the content characteristic analyzer, the content characteristic compounder assigning a weight to each of the plurality of second nodes, and computing a weighted average of the value of a content characteristic associated with at least some of the plurality of second nodes.

BRIEF DESCRIPTION OF THE DRAWINGS

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

The details of one or more implementations are set forth in the accompanying drawings and the description below. Other features, aspects, and advantages of the disclosure will become apparent from the description, the drawings, and the claims, in which:

Figure 1:
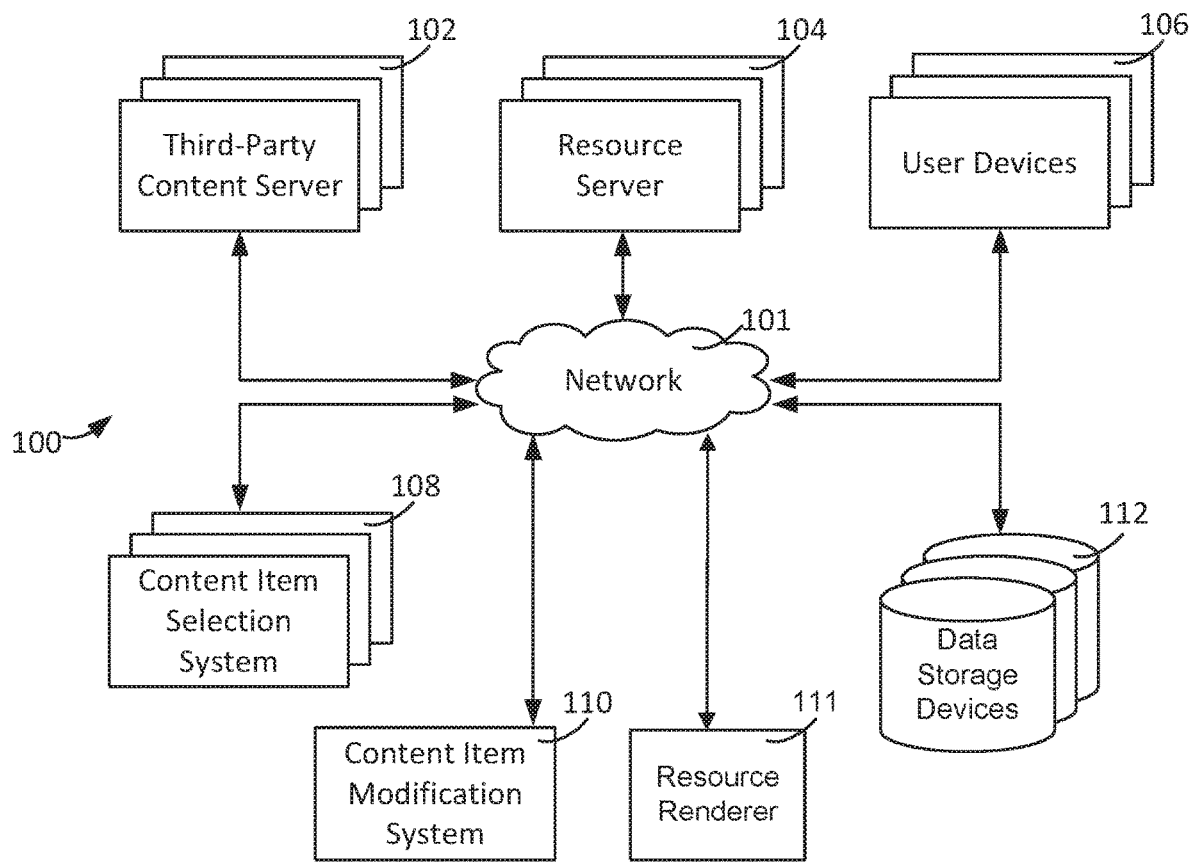
FIG. 1 is a block diagram of a computer system including a network, third-party content server, resource server, client devices, content item selection system, content item modification system, and data storage devices, according to a described implementation.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for providing information on a computer network. The various concepts introduced above and discussed in greater detail below may be implemented in any of numerous ways, as the described concepts are not limited to any particular manner of implementation. Specific implementations and applications are provided primarily for illustrative purposes.

Referring generally to the FIGURES, systems and methods for extracting and generating content modification are shown, according to a described implementation. The systems and methods described herein may be used to automatically create a content modification scheme and to use the content modification scheme to modify a third-party content item that is tailored to a particular resource such as a web page. In operation, a content item modification system in accordance with the present disclosure receives a uniform resource locator (URL) from a content item selection system. The URL identifies the particular resource. The content item modification system uses the URL to navigate to and render the resource. A first content slot on the resource to which a third-party content item will be displayed is determined. A second content slot on the resource is identified, where the second content slot has a content characteristic. Content characteristic includes colors, color schemes, fonts, styles, and dimensions. Content characteristic may also specify that no animations, sounds, or videos should be played. Content characteristics are extracted from the second content slot. The extracted content characteristics are stored in association with the first content slot. The content item modification system may then use the stored content characteristics to modify third-party content item that will be provided in the first content slot.

A client device may request a first-party content from a first-party content provider. The first-party content may be a web page requested by the client device or a stand-alone application (e.g., a video game, a chat program, etc.) running on the client device. The first-party content can include text, image, animation, video, and/or audio information. The first-party content provider can provide first-party content via a resource server for presentation on a client device over the Internet. Additional third-party content can also be provided by third-party content providers for presentation on the client device together with the first-party content provided by the first-party content providers. The third-party content may be an advertisement that appears in conjunction with a requested resource, such as a web page (e.g., a search result web page from a search engine, a web page that includes an online article, a web page of a social networking service, etc.) or with an application (e.g., an advertisement within a game). Thus, a user viewing a resource can access the first-party content that is the subject of the resource as well as the third-party content that may or may not be related to the subject matter of the resource.

The first-party content provider may request a third-party content server for a third-party content. The first-party content provider may also provide a resource or content to the client device that requires the client device to request additional third-party content from third-party content server. A third-party content server may have a plurality of third-party content items that are from, for instance, different third-party content providers such as advertisers. A third-party content server, when providing third-party content items for presentation with requested resources via the Internet or other network, may utilize a content item selection system to control or otherwise influence the selection and serving of the third-party content items. In some implementations, the first-party content provider, web page server and/or the client device can communicate with plurality of third-party content servers and content item selection systems. For instance, the web page server may alternate between two third-party content servers or use a third-party content server for specific content slots of a web page.

A third-party content provider may specify selection criteria (such as keywords) and corresponding bid values that are used in the selection of the third-party content items. The bid values may be utilized by the content item selection system in an auction to select and serve content items for presentation with a resource. For instance, a third-party content provider may place a bid in the auction that corresponds to an agreement to pay a certain amount of money if a user interacts with the provider's content item (e.g., the provider agrees to pay $3 if a user clicks on the provider's content item). In some instances, the content item selection system uses content item interaction data to determine the performance of the third-party content provider's content items that are modified by content characteristics extracted from the web page or from other third-party content presented on the web page. For instance, users may be more inclined to click on third-party content items that are modified by extracted content characteristics than unmodified third-party content items. Accordingly, auction bids to place the third-party content items may be higher or lower for web page publishers or first-party content providers that have an agreement with the third-party content providers to modify content characteristics of the third-party content items such as advertisements.

In some instances, one or more performance metrics for the third-party content items may be determined and indications of such performance metrics may be provided to the third-party content provider via a user interface for the content item management account. For instance, the performance metrics may include a cost per impression (CPI) or cost per thousand impressions (CPM), where an impression may be counted, for instance, whenever a content item is selected to be served for presentation with a resource. In some instances, the performance metric may include a click-through rate (CTR), defined as the number of clicks on the content item divided by the number of impressions. In some instances, the performance metrics may include a cost per engagement (CPE), where an engagement may be counted when a user interacts with the content item in a specified way. An engagement can be sharing a link to the content item on a social networking site, submitting an email address, taking a survey, and watching a video to completion. Still other performance metrics, such as cost per action (CPA) (where an action may be clicking on the content item or a link therein, a purchase of a product, a referral of the content item, etc.), conversion rate (CVR), cost per click-through (CPC) (counted when a content item is clicked), cost per sale (CPS), cost per lead (CPL), effective CPM (eCPM), and/or other performance metrics may be used. The various performance metrics may be measured before, during, or after content selection, content presentation, user click, or user engagement. In one instance, user click and user engagement may be measured by a click server that may be part of the content item management service.

In some instances, a web page or other resource (such as, for instance, an application) includes one or more content item slots in which a selected and served third-party content item may be displayed. The code (e.g., JavaScript®, HTML, etc.) defining a content item slot for a web page or other resource may include instructions to request a third-party content item from the content item selection system to be presented with the web page. In some implementations, the code may include an image request having a content item request URL that may include one or more parameters (e.g., /page/contentitem?devid=abc123&devnfo=A34r0). Such parameters may, in some implementations, be encoded strings such as "devid=abc123" and/or "devnfo=A34r0."

The selection of a third-party content item to be served with the resource by a content item selection system may be based on several influencing factors, such as a predicted click through rate (pCTR), a predicted conversion rate (pCVR), and a bid associated with the content item, etc. Such influencing factors may be used to generate a value, such as a score, against which other scores for other content items may be compared by the content item selection system through an auction. The pCTR and the pCVR may be higher for third-party content items that matching content characteristics as another third-party content item in the same web page or a content. Users viewing the web page may, for instance, have better user experience if the third-party content item contains matching content characteristics. Users may in turn be more inclined to click on the third-party content.

FIG. 1 is a block diagram of an implementation of a system 100 for content item modification using at least one computer network such as the network 101. The network 101 may include a local area network (LAN), wide area network (WAN), a telephone network, such as the Public Switched Telephone Network (PSTN), a wireless link, an intranet, the Internet, or combinations thereof. The system 100 can also include at least one data processing system, such as a content item selection system 108. The content item selection system 108 can include at least one logic device, such as a computing device having a data processor, to communicate via the network 101, for instance with a third-party content server 102, a resource server 104, a user device 106, content item modification system 110, a resource renderer 111, and/or a data storage device 112. In some implementations, the content selection system 108 may include a content item modification system 110. The content item selection system 108 may also include an interface configured to receive data via the network 101 and to provide data from the content item selection system 108 to any of the other devices on the network 101. The content item selection system 108 can include a server, such as an advertisement server or otherwise. Resource renderer 110 may receive resources from resource servers 104 via network 101 and render such data as a snapshot image (e.g., a visual representation of resources 106) and/or as a document object model (DOM) tree. The rendered data may be transmitted from resource renderer 111 to content item modification system 110 via network 101.

Still referring to FIG. 1, computer system 100 is shown to include a content item modification system 110. The content item modification system 110 can include at least one logic device, such as a computing device having a data processor, to communicate via the network 101, for instance with a third-party content server 102, a resource server 104, a user device 106, content item selection system 108, and/or a data storage device 112. The content item modification system 110 can include one or more data processors, such as a content placement processor, configured to execute instructions stored in a memory device to perform one or more operations described herein. In other words, the one or more data processors and the memory device of the content item modification system 110 may form a processing module. For instance, a content modification system module may be part of a content item selection system 108. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®. The processor may process instructions and output data to effect modification of a third-party content that is selected by a content item selection system 108 based on a web page or content provided by a resource server 104 or a third-party content server 102. Content item modification system 110 may be configured to extract content characteristic (e.g., colors, color schemes, fonts, styles, content characteristic specifying that no animations should be played, dimensions, etc.) from content items associated with resources. In addition to the processing circuit, the content item modification system 110 may include one or more databases configured to store data. A data storage device 112 may be connected to the content item modification system 110 through the network 101. Content item modification system 110 is described in greater detail with reference to FIG. 4.

Client devices 106 may include any number and/or type of user-operable electronic devices. For instance, client devices 106 may include a desktop computer, laptop, smart phone, wearable device, smart watch, tablet, personal digital assistant, set-top box for a television set, smart television, gaming console device, mobile communication devices, remote workstations, client terminals, entertainment consoles, or any other devices configured to communicate with other devices via the network 101. User devices 106 may be capable of receiving resource content from resources and/or third-party content items from content selection system 108 and/or content modification system 110. The device may be any form of electronic device that includes a data processor and a memory. The memory may store machine instructions that, when executed by a processor, cause the processor to perform one or more of the operations described herein. The memory may also store data to effect presentation of one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, HTML, Java®, JavaScript®, Perl®, Python®, Visual Basic®, and XML.

The user device 106 can execute a software application (e.g., a web browser or other application) to retrieve content from other computing devices over network 101. Such an application may be configured to retrieve first-party content from a resource server 104. In some cases, an application running on the user device 106 may itself be first-party content (e.g., a game, a media player, etc.). User devices 106 may include a user interface element (e.g., an electronic display, a speaker, a keyboard, a mouse, a microphone, a printer, etc.) for presenting content to a user, receiving user input, or facilitating user interaction with electronic content (e.g., clicking on a content item, hovering over a content item, etc.). User devices 106 may function as a user agent for allowing a user to view HTML encoded content. In some implementations, user devices 106 include an application (e.g., a web browser, a resource renderer, etc.) for converting electronic content into a user-comprehensible format (e.g., visual, aural, graphical, etc.). For instance, the user device 106 may execute a web browser application which provides a browser window on a display of the client device. The web browser application that provides the browser window may operate by receiving input of a uniform resource locator (URL), such as a web address, from an input device (e.g., a pointing device, a keyboard, a touch screen, or another form of input device). In response, one or more processors of the client device executing the instructions from the web browser application may request data from another device connected to the network 101 referred to by the URL address (e.g., a resource server 104). The other device may then provide web page data and/or other data to the user device 106, which causes visual indicia to be displayed by the display of the user device 106. Accordingly, the browser window displays the retrieved first-party content, such as web pages from various websites, to facilitate user interaction with the first-party content. User devices 106 may include a processor capable of processing embedded information (e.g., meta information embedded in hyperlinks, etc.) and executing embedded instructions. Embedded instructions may include computer-readable instructions (e.g., software code, JavaScript®, ECMAScript®, etc.) associated with a content slot within which a third-party content item is presented.

In some implementations, user devices 106 are capable of detecting an interaction with a distributed content item. An interaction with a content item may include displaying the content item, hovering over the content item, clicking on the content item, viewing source information for the content item, or any other type of interaction between user devices 106 and a content item. Interaction with a content item does not require explicit action by a user with respect to a particular content item. In some implementations, an impression (e.g., displaying or presenting the content item) may qualify as an interaction. The criteria for defining which user actions (e.g., active or passive) qualify as an interaction may be determined on an individual basis (e.g., for each content item) by content item selection system 108 or by content item modification system 110.

User devices 106 may generate a variety of user actions. For instance, user devices 106 may generate a user action in response to a detected interaction with a content item. The user action may include a plurality of attributes including a content identifier (e.g., a content ID or signature element), a device identifier, a referring URL identifier, a timestamp, or any other attributes describing the interaction. User devices 106 may generate user actions when particular actions are performed by a user device (e.g., resource views, online purchases, search queries submitted, etc.). The user actions generated by user devices 106 may be communicated to content item modification system 110 or a separate accounting system.

For situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated (e.g., by content item selection system 108) in one or more ways before it is stored or used, so that personally identifiable information is removed. For instance, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected (e.g., by an application, by user devices 106, etc.) and used by content item selection system 108.

The resource server 104 can include a computing device, such as a server, configured to host a resource, such as a web page or other resource (e.g., articles, comment threads, music, video, graphics, search results, information feeds, etc.). The resource server 104 may be a computer server (e.g., a file transfer protocol (FTP) server, file sharing server, web server, etc.) or a combination of servers (e.g., a data center, a cloud computing platform, etc.). The resource server 104 can provide resource data or other content (e.g., text documents, PDF files, and other forms of electronic documents) to the user device 106. In one implementation, the user device 106 can access the resource server 104 via the network 101 to request data to effect presentation of a resource of the resource server 104.

Resources provided by the resource server 104 may include any type of information or data structure that can be provided over network 101. In some implementations, resources may be identified by a resource address associated with the resource server 104 (e.g., a URL). Resources may include web pages (e.g., HTML web pages, PHP web pages, etc.), word processing documents, portable document format (PDF) documents, images, video, programming elements, interactive content, streaming video/audio sources, or other types of electronic information. Resources provided by the resource server 104 may be web pages, local resources, intranet resources, Internet resources, or other network resources. In some implementations, resources include one or more web pages to which user devices 106 are directed (e.g., via an embedded hyperlink) when user devices 106 interact with a third-party content item modified by a content item modification system 110 and provided by a content item selection system 108.

One or more third-party content providers may have third-party content servers 102 to directly or indirectly provide data for third-party content items to the content item selection system 108, the content item modification system 110, and/or to other computing devices via network 101. The content items may be in any format that may be presented on a display of a user device 106, for instance, graphical, text, image, audio, video, etc. The content items may also be a combination (hybrid) of the formats. The content items may be banner content items, interstitial content items, pop-up content items, rich media content items, hybrid content items, Flash® content items, cross-domain iframe content items, etc. The content items may also include embedded information such as hyperlinks, metadata, links, machine-executable instructions, annotations, etc. In some instances, the third-party content servers 102 may be integrated into the content item selection system 108 and/or the data for the third-party content items may be stored in a database of the content item selection system 108.

In one implementation, a content item selection system 108 can receive, via the network 101, a request for a content item to present with a resource. The received request may be received from a resource server 104, a user device 106, and/or any other computing device. The resource server 104 may be owned or ran by a first-party content provider that may include instructions for a plurality of content item selection systems 108 to provide third-party content items with one or more resources of the first-party content provider on the resource server 104. In one implementation, the resource may include a web page. The user device 106 may be a computing device operated by a user (represented by a device identifier), which, when accessing a resource of the resource server 104, can make a request to a content item selection system 108 for content items to be presented with the resource, for instance. The content item request can include requesting device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.) and resource information (e.g., URL of the requested resource, one or more keywords of the content of the requested resource, text of the content of the resource, a title of the resource, a category of the resource, a type of the resource, etc.). The information that the content item selection system 108 receives can include a HyperText Transfer Protocol (HTTP) cookie which contains a device identifier (e.g., a random number) that represents the user device 106. In some implementations, the device information and/or the resource information may be appended to a content item request URL (e.g., contentitem.item/page/contentitem?devid=abc123&devnfo=A34r0). In some implementations, the device information and/or the resource information may be encoded prior to being appended the content item request URL. The requesting device information and/or the resource information may be utilized by the content item selection system 108 to select third-party content items to be served with the requested resource and presented on a display of a user device 106.

In one implementation, the content item selection system 108 sends the URL of the resource to a content item modification system 110, which extracts content characteristic of a third-party content item in the resource. The third-party content item may be provided by a content item selection system 108. The extracted content characteristic may be stored in a data storage device 112, resource server 104, and/or the content item selection system 108, in association with the web page or the resource.

In some implementations, the third-party content provider may manage the selection and serving of content items by content item selection system 108. For instance, the third-party content provider may set bid values and/or selection criteria via a user interface that may include one or more content item conditions or constraints regarding the serving of content items. A third-party content provider may specify that a content item and/or a set of content items should be selected and served for user devices 110 having device identifiers associated with a certain geographic location or region, a certain language, a certain operating system, a certain web browser, etc. In another implementation, the third-party content provider may specify that a content item or set of content items should be selected and served when the resource, such as a web page, document, etc., contains content that matches or is related to certain keywords, phrases, etc. The third-party content provider may set a single bid value for several content items, set bid values for subsets of content items, and/or set bid values for each content item. The third-party content provider may also set the types of bid values, such as bids based on whether a user clicks on the third-party content item, whether a user performs a specific action based on the presentation of the third-party content item, whether the third-party content item is selected and served, and/or other types of bids.

Still referring to FIG. 1, system 100 is shown to include a resource renderer 111. Resource renderer 111 may be a hardware or software component capable of interpreting resources from resource servers 104 and creating a visual representation (e.g., an image, a display, etc.) thereof. For instance, resources may include marked up content (e.g., HTML, XML, image URLs, etc.) as well as formatting information (e.g., CSS, XSL, etc.). Resource renderer 111 may download the marked up content and formatting information and render resources according to World Wide Web Consortium (W3C) standards. Resource renderer 111 may create a "snapshot image" of resources and/or construct a document object model (DOM) tree representing resources.

The snapshot image may be a visual representation of a particular resource. The snapshot image may illustrate the visual appearance of the resource as presented on a user interface device (e.g., an electronic display screen, a computer monitor, a touch-sensitive display, etc.) after rendering resource. The snapshot image may include color information (e.g., pixel color, brightness, saturation, etc.) and style information (e.g., square corners, rounded edges, modern, rustic, etc.) for resource. In some implementations, the snapshot image may be a picture file having any viable file extension (e.g. jpg, .png, .bmp, etc.).

The DOM tree may be a hierarchical model of a particular resource. The DOM tree may include image information (e.g., image URLs, display positions, display sizes, alt text, etc.), font information (e.g., font names, sizes, effects, etc.), color information (e.g., RGB color values, hexadecimal color codes, etc.) and text information for the resource.

In various implementations, resource renderer 111 may be part of content item modification system 110 or a separate component. Resource renderer 111 may prepare the snapshot image and/or DOM tree in response to a rendering request from content item modification system 110. Resource renderer 111 may transmit the snapshot image and/or DOM tree to content item modification system 110 in response to the rendering request.

Still referring to FIG. 1, computer system 100 is shown to include data storage devices 112. Data storage devices 112 may be any type of memory device capable of storing content characteristic, profile data, content item data, accounting data, or any other type of data used by content item modification system 110 or another component of computer system 100. Data storage devices 112 may include any type of non-volatile memory, media, or memory devices. For instance, data storage devices 112 may include semiconductor memory devices (e.g., EPROM, EEPROM, flash memory devices, etc.) magnetic disks (e.g., internal hard disks, removable disks, etc.), magneto-optical disks, and/or CD ROM and DVD-ROM disks.

In some implementations, data storage devices 112 are local to content item modification system 110, content item selection system 108, resource server 104, or third-party content server 102. In other implementations, data storage devices 112 are remote data storage devices connected with content item modification system 110 and/or content item selection system 108 via network 101. In some implementations, data storage devices 112 are part of a data storage server or system capable of receiving and responding to queries from content item modification system 110 and/or content item selection system 108. In some implementations, data storage devices 112 are configured to store extracted content characteristics. For instance, data storage devices 112 may store content characteristics data for various content items displayed on resource.

Figure 2:
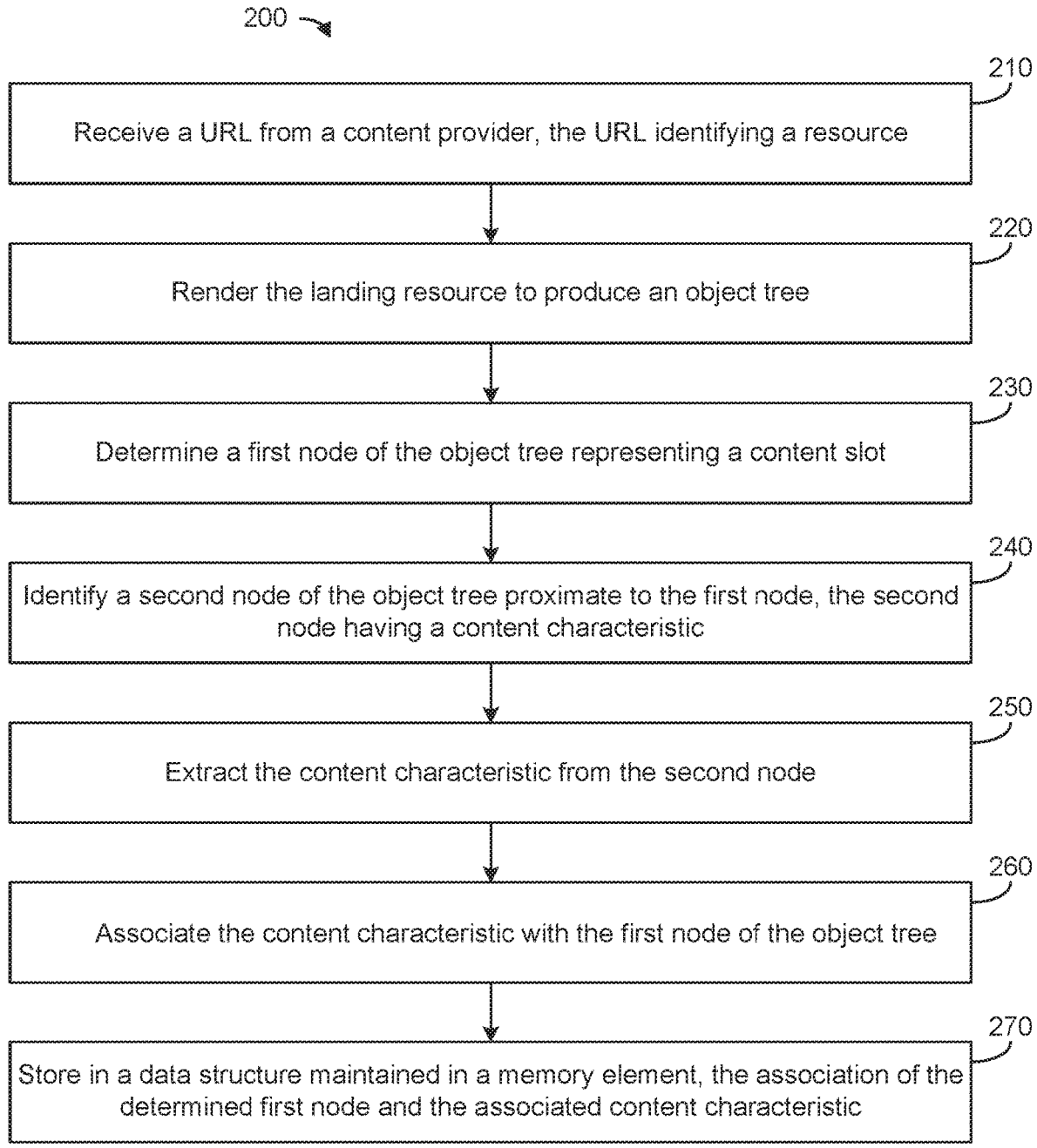
FIG. 2 is a flowchart of one implementation of a process for extracting content characteristic for content item modification.

FIG. 2 is a flowchart of one implementation of a process for extracting content characteristic for content item modification. In brief overview, the method generally includes receiving a URL (step 210), rendering the resource to produce an object tree (step 220), determining a first node of the object tree representing a content slot (step 230), and identifying a second node of the object tree proximate to the first node (step 240). The method further includes extracting a content characteristic from the second node (step 250), associating the content characteristic with the first node of the object tree (step 260), and storing in a data structure maintained in a memory element, the association of the determined first node and the associated content characteristic (step 270). In other implementations, these steps can be performed in a different order.

Specifically, the method includes receiving a URL from a content provider, the URL identifying a resource (step 210). The URL may be received from a content item selection system 108, as a part of a request to modify a third-party content item. The URL may also be received from a third-party content server 102 that is using the content item modification system 110 after a content item has been selected. The URL may also be received from the resource server 104 as part of a request to modify all or some of the third-party content items on the resource. In some implementations, instead of receiving the URL, a web crawler or a bot may crawl to a web page to find the URL. For instance, a web crawler may crawl to a web page that URL links to a plurality of other web pages. The web crawler may find one of the URL links. The URL may specify the location of a resource on the resource server 104 to which the resource renderer 111 or a user device may navigate. The resource may be a webpage, a local resource, an intranet resource, an Internet resource, or other network resource. The resource may contain multiple content slots to which third-party content items may be provided.

As shown in FIG. 2, the method further includes rendering the resource to produce an object tree (step 220). The resource renderer 111 or the renderer module 410 may render the resource. The object tree may be a DOM tree. In some implementations, rendering the resource includes parsing the web page corresponding to the received resource. For instance, the web page may be a HTML file that is then parsed to produce a corresponding DOM tree. In some implementations, parsing the resource may be done without rendering the web page. For instance, parser may be a module used by the resource renderer such that the parser module may be used without rendering the web page. In some implementations, rendering the resource may create a snapshot image. For instance, the snapshot image may be a visual representation of the resource. The snapshot image may illustrate the visual appearance of the resource as presented on a user interface device after rendering the resource. The snapshot image may include content items in content slots, the content items having content characteristics including color, color scheme, style, font, content characteristic that specifies no animation should be played, etc. The snapshot image may be associated with the DOM tree.

As shown in FIG. 2, the method further includes determining a first node of the object tree representing a content slot (step 230). The object tree may be parsed to determine a first content slot. The content slots may be identified by examining each node of the object tree and searching for a particular word such as, for instance, "adsbygoogle." The content slots may also be determined by looking for specific HTML tags associated with the nodes such as the tag "<script>." In some implementations, the object tree is traversed until a first node representing a content slot is encountered. For instance, the object tree is traversed from the beginning, and each node is examined to determine whether it is a content slot. In some implementations, the first node may be selected among a plurality of content slots because the first node has fewer content characteristics. For instance, the entire object tree is traversed to identity all or some content slots. One of the plurality of content slots is chosen as a first node based on, for instance, whether a content slot has or does not have certain content characteristics. The selected content slot, for instance, may not specify font while other content slots may specify font. In some implementations, one of the plurality of content slots may be chosen based on total number of content characteristics it lacks or has. For instance, the content slot may be chosen because it does not have any content characteristic.

As shown in FIG. 2, the method further includes identifying a second node of the object tree proximate to the first node, the second node having a content characteristic (step 240). The second node may have one or more content characteristic that is absent or is different from the first node. For instance, the first node may lack a content characteristic specifying font information and the second node may have a content characteristic specifying font. In general, a content slot may specify a color, a color scheme, a font, styles, dimensions, content characteristic specifying that no animations, sounds, or videos should be played, or other content characteristics. In some implementations, a content slot that is closest to the first node is identified as the second node. The distance may be calculated by using the object tree to determine the number of connections or links between two nodes in the object tree. The number of connections or links can be measured using the object tree. If, for instance, a parent node contains two children nodes, where each child node is a content slot, then the number of links between the two children nodes is two. In some implementations, after the whole object tree is parsed and every content slot is found, distance between the first node and some or all other content slots is calculated. The node with the smallest distance from the first node is selected as the second node. For instance, the second node of the object tree may be identified in the object tree by traversing the tree after the first node and identifying a first content slot. For another instance, the object tree is traversed after the first node, and the first content slot encountered is selected as the second node. For another instance, the object tree is traversed backwards from the first node to find the second node. In yet another instance, the object tree is traversed backwards and forwards to find the closest content slot proximate to the first node. In some implementations, spatial distance is calculated to determine the distance between two nodes. The snapshot image produced by the resource renderer 111 may be used to calculate the distance in pixels between two content slots, each corresponding to a node in the object tree. For instance, spatial distance between two content slots corresponding to two nodes of a webpage may be calculated. A content slot that is closest to the first node in terms of spatial distance may be selected as the second node.

In some implementations, a plurality of second nodes may be identified. In some implementations, the plurality of second nodes may include all nodes in the object tree corresponding to a content slot. In some implementations, at least some of the plurality of second nodes may have a content characteristic that is different from or absent in the first node. In some implementations, a plurality of second nodes may be selected based on having a content characteristic not specified in or different from the content characteristic of the first node. For instance, the first node may not have a content characteristic specifying color. The content slots for plurality of second nodes may be selected at least partially based on whether the content slot contains content characteristic specifying color. In some instance, the plurality of second nodes may only include nodes within a predetermined distance from the first node. The predetermined distance may be specified by a resource server 104 or a third-party content server 102. The content item modification system 110 or the content item selection system 108 may provide a default value for the predetermined distance. The distance between the first node and each node corresponding to a content slot can be measured and the nodes that are closer than the predetermined distance from the first node can be selected. For another instance, a predetermined spatial distance may be used to select a plurality of second nodes that are within that spatial distance. If, for instance, the predetermined spatial distance is 50 pixels, any nodes with corresponding content slots within 50 pixels of the content slot corresponding to the first node may be selected as a part of plurality of second nodes. In some implementations, a predetermined number of content slots that are closest to the content slot corresponding to the first node may be selected. For instance, five closest content slots may be selected. In some implementations, snapshot image is used to spatially group the content slots using cluster analysis such as k-means clustering. Every content slot in the same cluster as the first node may be selected as part of the plurality of second nodes.

In some implementations, the identified plurality of second nodes may be selected based on having a repeated pattern. For instance, all the content slots on the resource may be collected. A content characteristic that is most prevalent among all content slots in the resource may be identified. Each content slots specifying that prevalent content characteristic may be selected as part of the plurality of second nodes. For instance, if there are ten content slots in the resource and nine of them specify a specific font, those nine content slots may be selected as the plurality of second nodes. In some implementations, to determine the prevalent content characteristic of the content slots, similar content characteristic values may be grouped together. For instance, for colors, content slots that have similar color may be grouped together to determine whether the color is repeated. For this instance, a color may be similar if they are close in Red-Green-Blue (RGB) space, in a perception-based color space, or in any other color space. In some implementations, content slots may have more than one content characteristics that are repeated. For instance, ten content slots may be part of the plurality of second nodes. Nine of the content slots may have the same font, while eight of the content slots may have the same color. Content slots that have the same font and the content slots that have the same color may all be selected as part of the plurality of second nodes.

Figure 5:
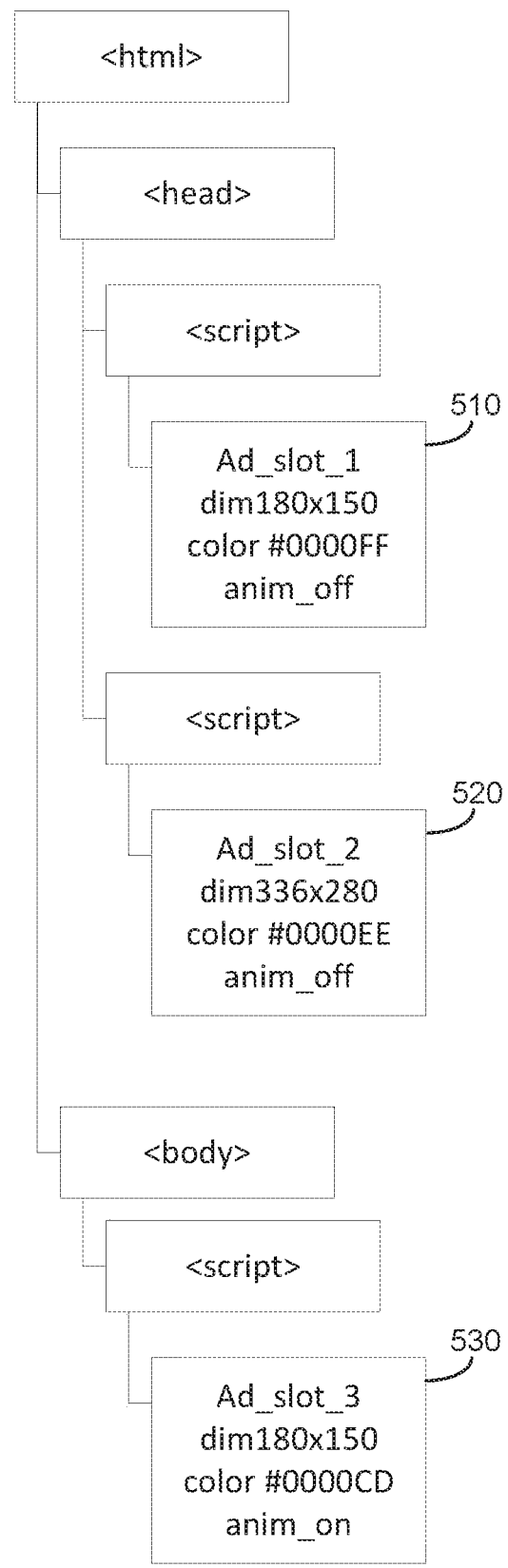
FIG. 5 is a block diagram of one implementations of an object tree.

For implementations that identify a plurality of second nodes, the method 200 may further include identifying a content characteristic associated with at least some of the plurality of second nodes 442. For instance, the plurality of second nodes may include two content slots and one of the content slot may specify a color blue. The content characteristic of color blue may be identified. In some implementations, a repeating content characteristic among the plurality of second nodes may be identified. A content characteristic may be associated with a majority or a subset of the plurality of second nodes. For instance, referring briefly to FIG. 5, there may be three content slots identified as part of the plurality of second nodes. Two of the content slots, nodes 510 and 520, may specify that animations are turned off, while the other content slot 530 may specify that animations are turned on. The content characteristic of animation turned off is selected because it is shared by the majority of the content slots. Alternatively, the content characteristic of color blue is selected because it is repeated. In some implementations, multiple content characteristics may be identified, where each content characteristic is associated with a majority or a subset of the plurality of second nodes. For instance, there may be ten content slots identified as plurality of the second nodes. Nine of the nodes may specify content characteristic of color blue, and eight of the nodes may specify a specific font. Both the color blue and the specific font are shared in majority of the plurality of second nodes, and thus both content characteristics are identified.

For implementations that identify a plurality of second nodes, the method 200 may optionally include averaging the content characteristic values of at least some the content slots identified as part of the plurality of second nodes. For instance, referring briefly to FIG. 5, the content slots of the plurality of second nodes may specify a color that is similar to blue but are not exactly the same as the color specified by all or some of the other content slots. There may be three content slots identified as the plurality of second nodes. One content slot 510 may have, for instance, a RGB hexadecimal value of #0000FF, another content slot 520 may have a RGB hexadecimal value of #0000EE, and yet another content slot 530 may have a RGB hexadecimal value of #0000CD. The average value of the three RGB hexadecimal value is calculated as #0000E9. In some implementations, a subset of content slots from the plurality of second nodes may be identified as sharing similar content characteristics that may be averaged. For instance, there may be four content slots in the plurality of second nodes. Three of the content slots may specify similar colors such as RGB hexadecimal values #0000FF, #0000EE, and #0000CD. The fourth content slot may specify a different RGB hexadecimal value, such as #FF0000. The first three content slots with similar color may be averaged while the fourth content slot is not taken as part of the average. The subset of content slots may be determined by cluster analysis such as k-means clustering analysis.

For some implementations that identify a plurality of second nodes, the method 200 in FIG. 2 may optionally include calculating a weighted average by assigning a weight to each of the plurality of second nodes and identifying a content characteristic comprising a weighted average of the value of a content characteristic associated with at least some of the plurality of second nodes. The weights may sum up to 1 and individually be greater than 0 and less than 1. In some implementations, the weight may be determined by the distance to the first node, by the size of the content slot, or by the salience score of the content slot in the snapshot image of the resource. For instance, referring briefly to FIG. 5, there may be three content slots in the plurality of second nodes. The first node may be on the top of the resource. One content slot 510 may be adjacent to the first node, another content slot 520 may be in the middle of the resource, and yet another content slot 530 may be at the bottom of the resource. The content slot 510 next to the first node may have the highest weight, and the content slot at the bottom 530 may have the lowest weight. The content slot 510 next to the first node have a color of hexadecimal value #0000FF and a weight of 0.6. The content slot 520 in the middle of the resource may have a color of hexadecimal value #0000EE and a weight of 0.3. The content slot 530 at the bottom of the resource may have a color of hexadecimal value #0000CD and a weight of 0.1 The weighted average will be a hexadecimal value of #0000F5. In some implementations, weights may be determined by relative size of each content slots, and the area of the content slots may be used to calculate the relative weight assigned to each content slot. For instance, bigger content slots may be given a bigger weight as compared to the smaller content slots. The area of a content slot may be calculated by its dimensions or by the snapshot image produced by the resource renderer 111.

In some implementations, a salience score of a content slot may be calculated to assign weights. A salience score for a content slot may indicate the relative importance or prominence with which the content slot is displayed on the resource. After all salience scores has been calculated for each of the plurality of second nodes, the salience scores may be normalized so as to sum up to 1. The salience score may depend on, for instance, a vertical placement of the image (e.g., top of the page, middle of the page, bottom of the page, etc.), the display size of the image (e.g., display height, display width, etc.), whether the image is centered on the resource, and/or other image salience scoring criteria.

One instance of a content slot salience scoring algorithm that can be used to assign a salience score is:

$$\text{Salience} = \alpha*\text{sigmoid}_1(\text{position}_y, y_0, dy) + \beta*\text{sigmoid}_2(\text{width}, w_0, d_{size})*\text{sigmoid}_2(\text{height}, h_0, d_{size}) + \delta*\text{central\_alignment}$$

In some implementations, $\alpha$, $\beta$, and $\delta$ are all positive and sum to 1.0.

Sigmoid$_1$ (position$_y$, y$_0$, dy) may be a sigmoid function ranging from 1.0 at position$_y$=0 (e.g., the top of resource) to 0.0 at position$_y$=∞ (e.g., the bottom of the resource, significantly distant from the top of the resource, etc.). y$_0$ may be the point at which Sigmoid$_1$=0.5 and dy may control the slope of the sigmoid function around y$_0$. Sigmoid$_2$ may be defined as (1−Sigmoid$_1$) and central_alignment may be a measure of whether the image is centrally aligned (e.g., horizontally centered) on the resource. Central_alignment may be 1.0 if the image is perfectly centered and may decrease based on the distance between the center of the image and the horizontal center of the resource.

For some content characteristics, average value or weight average value cannot or should not be computed. For instance, categorical or ordinal variables such as font cannot be averaged. For another instance, dimensions of content slots should not be averaged because the dimensions should match that of the third-party content item. For yet another instance, one content characteristic specifies that animations, sounds, or videos should be turned off in the third-party content item, and such content characteristic should not be averaged.

As shown in FIG. 2, the method further includes extracting a content characteristic from the second node. In some implementations, the second node may have only one content characteristic. In some implementations, the second node may have more than one content characteristics. The content characteristics may be extracted from the object tree or the resource. In some implementations, the content characteristics may be extracted from a snapshot image of the resource that is rendered by the resource renderer 111. For instance, portions of the snapshot image corresponding to the second node may be examined to extract different content characteristics. In some implementations, only portions of the resource that correspond to the second node may be rendered. Different content characteristics may be extracted from the rendered image. For instance, color of the content item in the second node may be extracted. Extracting from the rendered snapshot image allows extraction of additional content characteristic that may not be specified in the object tree. For instance, the snapshot image may accurately illustrate the visual appearance of resource including actual display sizes of HTML elements and style information rendered by JAVASCRIPT.

In some implementations, extracting color content characteristic may be done by extracting dominant colors of a portion of the snapshot image corresponding to the second node. In some implementations, dominant color can be extracted using a clustering technique such as k-means clustering. For instance, each pixel of the portion of the snapshot image corresponding to the second node may be treated as an independent color measurement (e.g., an independent k-means observation). The color of each pixel may be represented using RGB color values ranging from zero saturation (e.g., 0) to complete saturation (e.g., 255) for each primary color of light (e.g., red, green, and blue). A set of predefined colors (e.g., RGB (0, 0, 0), RGB (225, 0, 0), RGB (0, 255, 0), RGB (0, 0, 225), RGB (255, 255, 0), RGB (255, 0, 255), RGB (0, 255, 255), RGB (255, 255, 255), etc.) may be used as initial cluster means and each pixel may be assigned to the cluster with the mean value closest to the RGB color value of the pixel.

For instance, the RGB color value of each pixel may be compared with each cluster mean using the following formula: $|R_{mean}-R_{pixel}|+|G_{mean}-G_{pixel}|+|B_{mean}-B_{pixel}|$=difference. In some implementations, a new mean may be created if the difference between the RGB color value for a pixel and the closest cluster mean exceeds a threshold value (e.g. $|R_{mean}-R_{pixel}|+|G_{mean}-G_{pixel}|+|B_{mean}-B_{pixel}|$>threshold). After assigning each pixel to the closest cluster (e.g., the cluster having a mean value closest to the color value for the pixel), each mean cluster value may be re-computed based on the RGB color values of the pixels in each cluster. In some implementations, successive iterations may be performed by reassigning pixels to the closest cluster until the clusters converge on steady mean values or until a threshold number of iterations has been performed.

Refined color clusters may be ranked based on the number of pixels in each cluster. For instance, the color cluster with the most pixels may be ranked as expressing the most dominant color, the color cluster with the second most pixels may be ranked as expressing the second most dominant color, etc. In some implementations, a weight to each color may be assigned based on the number of pixels in the corresponding color cluster relative to the total number of pixels in the snapshot image. A list of extracted colors (e.g., RGB values) may be generated along with a weight or dominance ranking of each color.

Advantageously, k-means clustering may provide a color extraction technique which does not increase in time complexity as a function of the square of the number of pixels in the snapshot image (e.g., time_complexity≠$K*n_{pixels}^2$). Instead, k-means clustering has a time complexity proportional to the number of pixels multiplied by the number of clustering iterations (e.g. time_complexity=$K*n_{pixels}$*iterations). The linear relationship between pixel number and time complexity with k-means clustering may result in an improved computation time over other color extraction techniques, especially when extracting colors from relatively large snapshot images.

In addition to extracting colors, color schemes may also be extracted by selecting different extracted colors as background color, text color, link color, button color, headline color, description color, button text color, or other portions of the third-party content item. For instance, the most dominant color (e.g., heaviest weighted, highest dominance ranking, etc.) may be selected as the background color for the content item. The extracted color with the highest multiplied saturation and weight (e.g., max (saturation*weight)) may be selected as the button color for the content item. The colors with the highest contrast and/or brightness differences with the selected background color may be selected as the colors for the headline and description text. The more noticeable color as the headline color is selected if more than two colors are available.

As shown in FIG. 2, the method further includes associating the content characteristic with the first node of the object tree (step 260). In one implementation, the memory location of the first node of the object tree (step 260) may now include the associated content characteristics or include memory references to the associated characteristics. In some implementations, DOM node attributes may be set, toggled, or overwritten. In some implementations, a list of changes to the first node may be kept, where the list references the first node.

As shown in FIG. 2, the method includes storing in a data structure maintained in a memory element, the association of the determined first node and the associated content characteristic (step 270). The memory element may be part of the content item modification system 110, content item selection system 108, third-party content server 102, or data storage devices 112. In some implementations, the data structure may also store the URL of the content item, account information related to the resource or the third-party content item, and other information. The data structure may also store the object tree and which content slot the modifications are associated with. In some implementations, a list of changes to the first node may be used to update the data structure. After storing the content characteristics, when the content item selection system 108 selects a third-party content item to be provided to a user device 106, the provided third-party content item is modified by the stored content characteristics.

Figure 3:
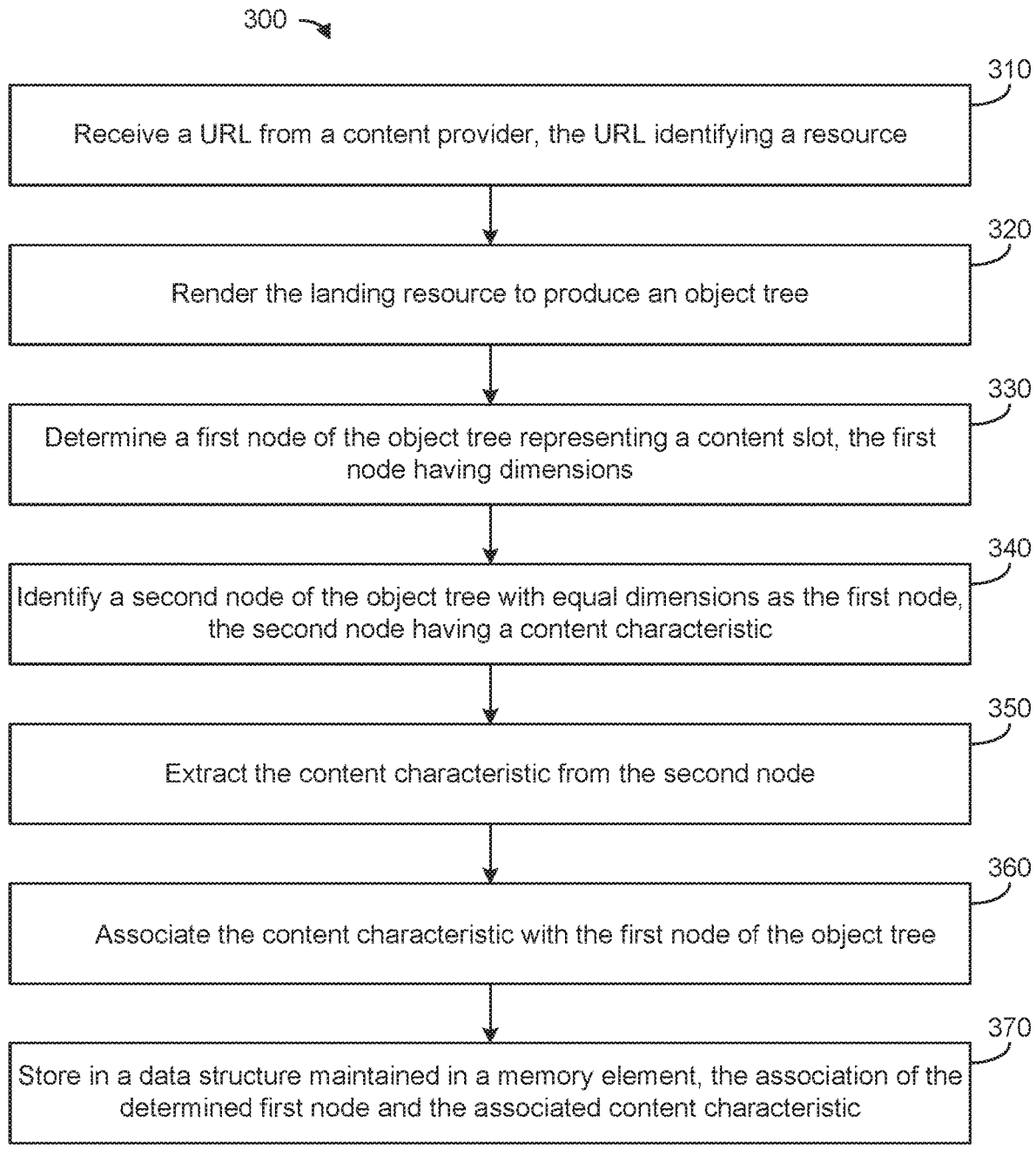
FIG. 3 is a flowchart of one implementation of a process for extracting content characteristic for content item modification using content slot dimensions.

FIG. 3 is a flowchart of one implementation of a process for extracting content characteristic for content item modification using content slot dimensions. The method 300 includes receiving a URL (step 310), rendering the resource to produce an object tree (step 320), determining a first node of the object tree representing a content slot, the first node having dimensions (step 330), and identifying a second node of the object tree with equal dimensions as the first node (step 340). The method further includes extracting a content characteristic from the second node (step 350), associating the content characteristic with the first node of the object tree (step 360), and storing in a data structure maintained in a memory element (step 370), the association of the determined first node and the associated content characteristic (step 380). In other implementations, these steps can be performed in a different order.

Most of the steps of the method 300 are similar to the corresponding steps described in relation to FIG. 2. Specifically, receiving a URL from a content provider (step 310) corresponds to step 210). Rendering the landing resource (step 320) corresponds to step 220. Extracting the content characteristic (step 350) corresponds to step 250. Associating the content characteristic (step 360) corresponds to step 260. Storing the association (step 370) corresponds to step 270.

The method 300 includes determining a first node of the object tree representing a content slot, the first node having dimensions (step 330). In some implementations, an object tree representing a received resource is traversed from the beginning. In some implementations, the first content slot that has a content characteristic specifying dimensions is selected as the first node. In other implementations, a third-party content item that has dimensions is selected by the content item selection system 108. During the traversal, the first node is selected that has the same dimensions as the third-party content item. In some implementations, the entire object tree is traversed to identify all or some content slots that have the same dimensions as the third-party content item. For instance, a resource may have multiple content slots having dimensions of 728×90 pixels. The resource may also have multiple content slots having dimensions of 180×150 pixels. The selected third-party content item may have dimensions of 180×150 pixels. When traversing the object tree, all content slots with dimensions 180×150 pixels may be identified, and one of these content slots may be selected as the first node. One of the plurality of content slots is chosen as a first node based on, for instance, whether a content slot has or does not have certain content characteristics. In some implementations, one of the plurality of content slots may be chosen based on total number of content characteristics it lacks or has.

The method 300 further includes identifying a second node of the object tree with equal dimensions as the first node, the second node having content characteristic (step 340). The identified second node has the same dimensions as the first node. In some implementations, the identified second node also has the same dimensions as the selected third-party content item. In some implementations, the object tree is traversed from the first node until a second node representing a content slot having equal dimensions as the first node is encountered. For instance, referring briefly to FIG. 5, the first node 510 specifies dimensions of 180×150 pixels and a second node is selected if it has the same dimensions. The object tree may be traversed after the first node 510, and a content slot 520 with dimensions of 336×280 pixels may be encountered which is not chosen due to having different dimensions. Further traversing the object tree, a content slot 530 with dimensions of 180×150 pixels is encountered, which is then designated as the second node. In some implementations, a plurality of second nodes are selected, each of the plurality of second nodes specifying the same dimensions as the first node. For instance, if the first node is identified to have dimensions of 180×150 pixels, then every content slot on the resource with the dimensions of 180×150 pixels is selected as one of the plurality of second nodes. In some implementations, a plurality of content slots each with equal dimensions as the first node is identified. In some implementations, a plurality of content slots each with equal dimensions as the first node within a predetermined distance from the first node is identified. One of the plurality of content slots is selected as the second node. For instance, of the plurality of content slots, the closest one to the first node may be selected as the second node. Distance may be measured in the number of connections or link using the object tree, or in spatial distance using the snapshot image. As another instance, of the plurality of content slots, the one with the most or least number of content characteristics may be selected as the second node. In some implementations, the plurality of content slots is selected as a plurality of seconds nodes, as discussed below in relation to FIG. 4.

Figure 4:
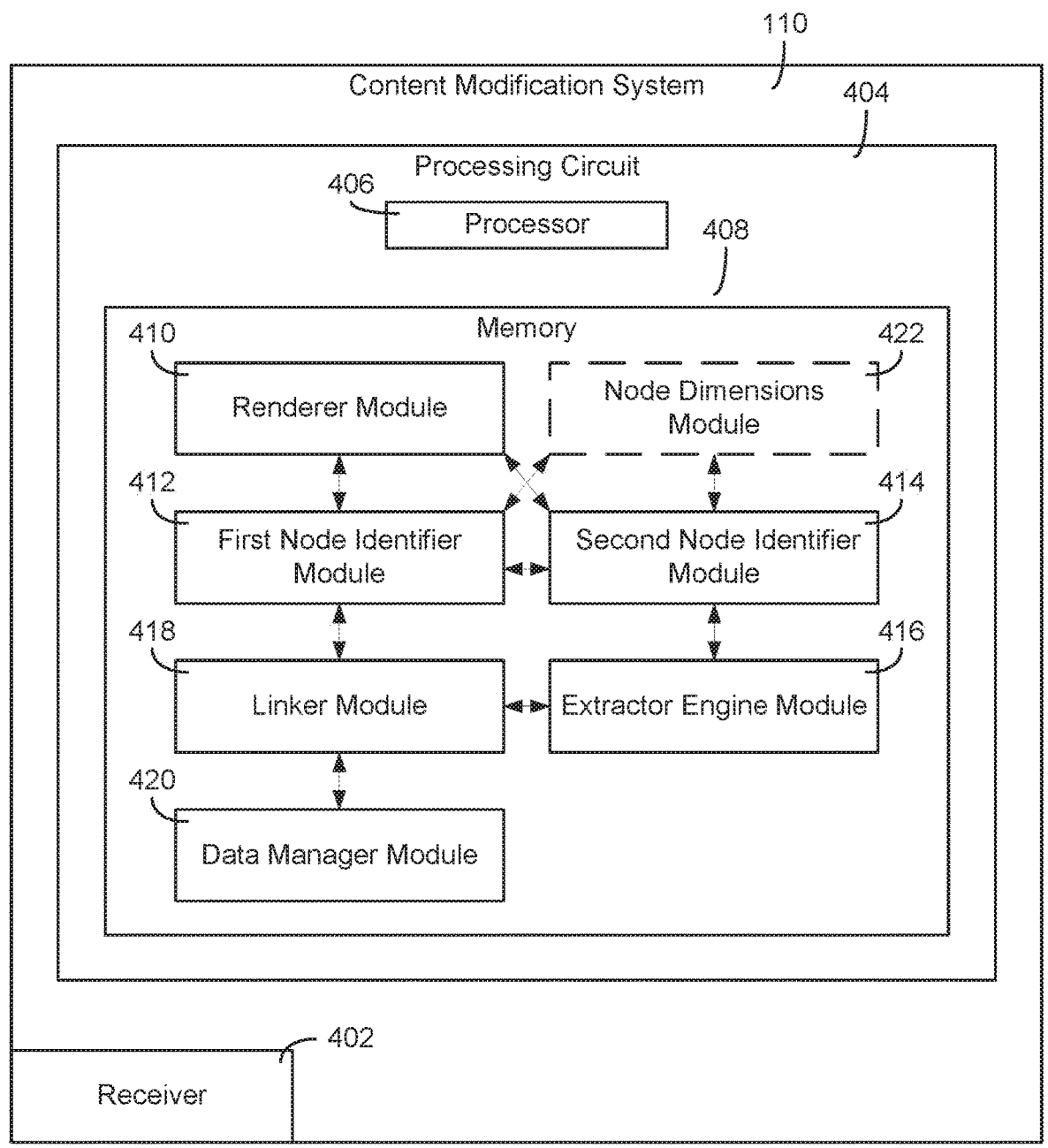
FIG. 4 is a block diagram illustrating one implementations of the content item modification system of FIG. 1 in greater detail, showing a receiver, a renderer module, a first node identifier module, a second node identifier module, an extractor engine module, a linker module, a data manager module, and a node dimensions module.

FIG. 4 is a block diagram illustrating one implementations of the content item modification system 110 of FIG. 1 in greater detail, showing a receiver, a renderer module, a first node identifier module, a second node identifier module, an extractor engine module, a linker module, a data manager module, and a node dimensions module. Content item modification system 110 is shown to include a receiver 402 and a processing circuit 404. Receiver 402 may be a communication interface that includes wired or wireless interfaces (e.g., jacks, antennas, transmitters, receivers, transceivers, wire terminals, Ethernet ports, WiFi transceivers, etc.) for conducting data communications with local or remote devices or systems. For instance, communications interface 402 may allow content item modification system 110 to communicate with content item selection system 108, resource servers 104, user devices 106, third-party content servers 102, data storage devices 112, and other components of computer system 100.

Processing circuit 404 is shown to include a processor 406 and memory 408. Processor 406 may be implemented as a general purpose processor, an application specific integrated circuit (ASIC), one or more field programmable gate arrays (FPGAs), a CPU, a GPU, a group of processing components, or other suitable electronic processing components.

Memory 408 may include one or more devices (e.g., RAM, ROM, flash memory, hard disk storage, etc.) for storing data and/or computer code for completing and/or facilitating the various processes, layers, and modules described in the present disclosure. Memory 408 may include volatile memory or non-volatile memory. Memory 408 may include database components, object code components, script components, or any other type of information structure for supporting the various activities and information structures described in the present disclosure. In some implementations, memory 408 is communicably connected to processor 406 via processing circuit 404 and includes computer code (e.g., data modules stored in memory 408) for executing one or more processes described herein. In brief overview, memory 408 is shown to include a renderer module 410, a first node identifier module 412, a second node identifier module 414, an extractor module 416, a linker module 418, a data manager module 420, and an optional node dimensions module 422.

Still referring to FIG. 4, memory 408 is shown to include a renderer module 410. In some implementations, resource rendering is performed by renderer module 410 rather than an external resource rendering service (e.g., resource renderer 111). Renderer module 410 may include the functionality of resource renderer 111 as described with reference to FIG. 1. For instance, renderer module 410 may be capable of interpreting resources from resource servers 104 and creating a visual representation (e.g., an image, a display, etc.) thereof.

Renderer module 410 may identify a particular resource using a URL or other indicator provided by content item modification system 110 as part of a request to modify content items. Renderer module 410 may read and interpret marked up content (e.g., HTML, XML, image URLs, etc.) and formatting information (e.g., CSS, XSL, etc.) from resources and render resources (e.g., according to W3C standards). Renderer module 410 may create a snapshot image of resources and/or construct a DOM tree representing resources.

The snapshot image may be a visual representation of the identified resource. The snapshot image may illustrate the visual appearance of the resource as presented on a user interface device (e.g., an electronic display screen, a computer monitor, a touch-sensitive display, etc.) after rendering resource. The snapshot image may include content items in content slots, the content items comprising content characteristics including color, style, font, animation, etc. In some implementations, the snapshot image may be a picture file having any viable file extension (e.g. jpg, .png, .bmp, etc.).

The DOM tree may be a hierarchical model of a resource. Nodes in the dome tree may be specified as content slots. Nodes may further be specified to have attributes or content characteristics such as font information (e.g., font names, sizes, effects, etc.), color information (e.g., RGB color values, hexadecimal color codes, etc.), styles, dimensions, whether to play animations, sounds, or videos, and other content characteristics. The snapshot image and/or DOM tree may contain content slot information as well as content characteristic associated with the content slot. Renderer module 410 may store the snapshot image and/or DOM tree in memory 408 for subsequent use by other modules content item modification system 110.

Still referring to FIG. 4, memory 408 is shown to include a first node identifier module 412. The first node identifier module 412 can be connected to the renderer module 410 to receive the object tree or the snapshot image or the memory location in which the object tree or the snapshot image is stored. Generally, the first node identifier module 412 may perform the stage (step 230) in FIG. 2. Specifically, the first node identifier module 412 may parse the DOM tree to determine a node of the DOM tree that corresponds to a content slot where third-party content items may be displayed. For instance, the first node identifier module 412 may search for particular words, tags, or attributions in the DOM tree to identify content slots. In some implementations, the first node identifier module 412 may include a tree traversal module that traverses the DOM tree until a first node representing a content slot is encountered. In some implementations, the tree traversal module may traverse the entire DOM tree to identify a plurality of nodes, and the first node identifier module 412 may select a first node from the plurality of nodes that has fewer content characteristics. In some implementations, the first node identifier module 412 may choose one of the plurality of nodes based on total number of content characteristics it lacks or has.

Still referring to FIG. 4, memory 408 is shown to include a second node identifier module 414. The second node identifier module 414 can be connected to the renderer module 410 or to the first node identifier module 412 to receive the object tree or the snapshot image or the memory location in which the object tree or the snapshot image is stored. The second node identifier module 414 may also receive information from the first node identifier module 412 indicating which content slot in the resource is the first node. Generally, the second node identifier module 414 may perform the stage (step 240) in FIG. 2. Specifically, the second node identifier module 414 identifies a second node of the object tree proximate to the first node, the second node having a content characteristic (step 240). The second node may have one or more content characteristic that is absent or is different from the first node. A content slot may specify a color, a color scheme, a font, styles, dimensions, content characteristic specifying that no animations, sounds, or videos should be played, or other content characteristic. In some implementations, the second node identifier module 414 may include a closest node selector that identifies a second node that is closest to the first node. A node distance calculator may calculate the distance, which may be calculated by analyzing the object tree to determine the number of connections or links between two nodes in the object tree. In some implementations, after the whole object tree is parsed and every content slot is found, the node distance calculator calculates the distance between the first node and some or all other content slots. The content slot with the smallest distance is selected as the second node. In some implementations, spatial distance between two nodes may be calculated by using the snapshot image produced by the renderer module 410 or the resource renderer 111.

In some implementations, the second node identifier module 414 includes a multi-node identifier that identifies a plurality of second nodes, as described in relation to FIG. 4. Specifically, the multi-node identifier may identify a plurality of second nodes within a predetermined distance from the first node.

In some implementations, the memory 408 may also include a content characteristic analyzer that identifies a content characteristic associated with at least some of the plurality of second nodes as determined by the multi-node identifier. The content characteristic analyzer may include a node counter that determines a number of nodes required to be a majority in the plurality of second nodes, and the content characteristic analyzer may identify a content characteristic associated with a majority of the plurality of second nodes. The content characteristic analyzer may also include a content characteristic smoother which averages the value of content characteristic associated with at least some of the plurality of second nodes. The content characteristic analyzer may also include a font identifier that identifies a font associated with at least one of the plurality of second nodes. The content characteristic analyzer may also include a content characteristic compounder that assigns a weight to each of the plurality of second nodes and identifies a content characteristic comprising a weighted average of the value of a content characteristic associated with at least some of the plurality of second nodes.

Still referring to FIG. 4, memory 408 is shown to include an extractor engine module 416. The extractor engine module 416 can be connected to the second node identifier module 414 and receive the second node or the memory location of the second node. The extractor engine module 416 may also receive the object tree, the snapshot image, or the resource or the memory location of the object tree, the snapshot image, or the resource from the renderer module 410, the second node identifier module 414 or from the receiver 402. Generally, the extractor engine module 416 may perform the stage (step 250) in FIG. 2. Specifically, extractor engine module 416 extracts a content characteristic from the second node. The second node may have one or more content characteristic. The content characteristics may be extracted from the object tree or the resource. In some implementations, the content characteristics may be extracted from a snapshot image of the resource that is rendered by the resource renderer 111 or the renderer module 410. In some implementations, only portions of the resource that correspond to the second node may be rendered. Different content characteristics may be extracted from the rendered image. Extracting from the rendered snapshot image allows extraction of additional content characteristic that may not be specified in the object tree. The extractor engine module 416 may also extract the dominant color or colors of the content item using a clustering technique such as k-means clustering.

Still referring to FIG. 4, memory 408 is shown to include a linker module 418. The linker module 418 is connected to the first node identifier module 412 to receive the first node or the memory location of the first node. The linker module 418 is also connected to the extractor engine module 416 to receive the extracted content characteristic or memory location of the extracted content characteristic. The linker module 418 may also receive the memory location of the object tree. Generally, the linker module 418 may perform the stage (step 260) in FIG. 2. In one implementation, the linker module 418 stores the extracted content characteristics or memory references to the extracted content characteristics in the memory location of the first node of the object tree. In some implementations, the linker module 418 may set, toggle, or overwrite DOM node attributes. In some implementations, the linker module 418 may create a list of changes that references the first node.

Still referring to FIG. 4, memory 408 is shown to include a data manager module 420. The data manager module 420 can be connected to the linker module 418 and may receive the linker first node. Generally, the data manager module 420 may perform the stage (step 270) in FIG. 2. Specifically, the data manager module 420 may create or update a data structure that stores the first node with the extract content characteristic. In some implementations, the data structure may also store the URL of the content item, account information related to the resource or the third-party content item, and other information. The data structure may also store the object tree and which content slot the modifications are associated with. In some implementations, a list of changes to the first node may be used to update the data structure.

Still referring to FIG. 4, memory 408 is shown to optionally include node dimensions module 422. The node dimension module 422 may be connected to the first node identifier module 412, and the second node identifier module 414. The node dimension module 422 may also receive the object tree or the memory location of the object tree. The node dimension module 422 may determine the node dimensions of a given node in the object tree. The first node identifier 412 and the second node identifier 414 may use the node dimension module 422 to perform the stages (step 330) and (step 340) in FIG. 3. Alternatively, the node dimension module 422 may perform these stages. In some implementations, the node dimension module 422 determines a first node of the object tree representing a content slot to have dimensions. In some implementations, the node dimension module 422 traverses the object tree from the beginning. In some implementations, the node dimension module 422 selects the first content slot that has a content characteristic specifying dimensions as the first node. In other implementations, the node dimension module 422 accesses dimensions received by the receiver 402. The dimensions may be, for instance, of a third-party content item selected by the content item selection system 108. During the traversal, the node dimension module 422 selects the first node that has the same dimensions as the received dimensions. In some implementations, the node dimension module 422 traverses the entire object tree to identity all or some content slots that have the same dimensions as the received dimensions. The node dimension module 422 may also identify a second node of the object tree with equal dimensions as the first node, the second node having content characteristic. In some implementations, the node dimension module 422 identifies a second node that has the same dimensions as the first node or the third-party content item. In some implementations, the node dimension module 422 selects a plurality of second nodes, each node specifying the same dimensions as the first node.

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially-generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "client or "server" include all kinds of apparatus, devices, and machines for processing data, including a programmable processor, a computer, a system on a chip, or multiple ones, or combinations, of the foregoing. The apparatus may include special purpose logic circuitry, e.g., a field programmable gate array (FPGA) or an application-specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices semiconductor memory devices (e.g., EPROM, EEPROM, and flash memory devices; magnetic disks, e.g., internal hard disks or removable disks; magneto-optical disks; and CD-ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for instance, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for instance, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front-end component (e.g., a client computer) having a graphical user interface or a web browser through which a user may interact with an implementation of the subject matter described in this disclosure, or any combination of one or more such back-end, middleware, or front-end components. The components of the system may be interconnected by any form or medium of digital data communication (e.g., a communication network). Communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products embodied on one or more tangible media.

Thus, particular implementations of the subject matter have been described. Other implementations are within the scope of the following claims. In some cases, the actions recited in the claims can be performed in a different order and still achieve desirable results. In addition, the methods depicted in the accompanying figures do not necessarily require the particular order shown, or sequential order, to achieve desirable results. In certain implementations, multitasking and parallel processing may be advantageous.

What is claimed is:

1. A system to generate modified content, comprising:
a content modification system comprising one or more processors and memory to:
identify a uniform resource locator ("URL") that identifies a resource provided by a first-party content provider different from the content modification system;
determine a plurality of nodes associated with the resource, the plurality of nodes configured by the first-party content provider and comprising a first node and a second node, wherein a first-party content item provided by the first-party content provider is to be presented in the second node;
extract, based on a distance between the first node and the plurality of nodes, a content characteristic from the second node that is associated with a subset of the plurality of nodes; and
modify, based on the content characteristic, a content item provided by a third-party content provider different from each of the content modification system and the first-party content provider, the content item to be presented in the first node of the plurality of nodes of the resource provided by the first-party content provider.

2. The system of claim 1, comprising the one or more processors to:
determine the distance between the first node and each of the plurality of nodes to identify the subset of the plurality of nodes as having a distance within a threshold;
determine, based on the distance between the first node and each of the plurality of nodes, the content characteristic to use to modify the content item for a content slot corresponding to the first node.

3. The system of claim 1, comprising the one or more processors to:
determine an object tree based on the resource, wherein the object tree comprises the plurality of nodes, wherein at least one of the plurality of nodes is configured for content items comprising audio.

4. The system of claim 1, comprising the one or more processors to:
receive input detected by a microphone of a client device; and
select at least one of the resource or the content item responsive to the input.

5. The system of claim 1, wherein the content item comprises audio.

6. The system of claim 1, wherein the resource comprises audio.

7. The system of claim 1, wherein the resource comprises streaming audio.

8. The system of claim 1, comprising:
the one or more processors to provide the content item to a client device to cause the client device to at least partially present the content item via a speaker of the client device.

9. The system of claim 1, wherein the one or more processors at least partially execute a digital assistant.

10. The system of claim 1, wherein the one or more processors communicate with a client device that presents the content item, the client device comprising a digital assistant.

11. The system of claim 1, wherein the content characteristic corresponds to at least one of sound or style.

12. A method of generating modified content, comprising:
identifying, by a content modification system comprising one or more processors, a uniform resource locator ("URL") that identifies a resource provided by a first-party content provider different from the content modification system;
determining, by the content modification system, a plurality of nodes associated with the resource, the plurality of nodes configured by the first-party content provider and comprising a first node and a second node, wherein a first-party content item provided by the first-party content provider is to be presented in the second node;
extracting, by the content modification system, based on a distance metric between the first node and the plurality of nodes, a content characteristic from the second node that is associated with a subset of the plurality of nodes; and
modifying, by the content modification system based on the content characteristic, a content item provided by a third-party content provider different from each of the content modification system and the first-party content provider, the content item to be presented in the first node of the plurality of nodes of the resource provided by the first-party content provider.

13. The method of claim 12, comprising:
determining the distance between the first node and each of the plurality of nodes to identify the subset of the plurality of nodes as having a distance within a threshold; and
determining, based on the distance between the first node and each of the plurality of nodes, the content characteristic to use to modify the content item for a content slot corresponding to the first node.

14. The method of claim 12, comprising:
determining an object tree based on the resource, wherein the object tree comprises the plurality of nodes, wherein at least one of the plurality of nodes is configured for content items comprising audio.

15. The method of claim 12, comprising:
receiving input detected by a microphone of a client device; and
selecting at least one of the resource or the content item responsive to the input.

16. The method of claim 12, wherein the resource comprises audio, and the content item comprises audio.

17. The method of claim 12, comprising:
providing the content item to a client device to cause the client device to at least partially present the content item via a speaker of the client device.

18. The method of claim 12, wherein the one or more processors at least partially execute a digital assistant.

19. The method of claim 12, wherein the one or more processors communicate with a client device that presents the content item, the client device comprising a digital assistant.

20. The system of claim 1, wherein the content characteristic corresponds to at least one of sound or style.

* * * * *